(12) United States Patent
Hu et al.

(10) Patent No.: US 11,064,503 B2
(45) Date of Patent: Jul. 13, 2021

(54) METHOD AND APPARATUS FOR TRANSMITTING CONTROL INFORMATION

(71) Applicant: HUAWEI TECHNOLOGIES CO., LTD., Guangdong (CN)

(72) Inventors: Xingxing Hu, Shanghai (CN); Tianle Deng, Shenzhen (CN); Man Wang, Shanghai (CN); Kaijie Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 111 days.

(21) Appl. No.: 16/159,273

(22) Filed: Oct. 12, 2018

(65) Prior Publication Data
US 2019/0045516 A1    Feb. 7, 2019

Related U.S. Application Data

(63) Continuation of application No. PCT/CN2016/079420, filed on Apr. 15, 2016.

(51) Int. Cl.
| | |
|---|---|
| *H04W 72/08* | (2009.01) |
| *H04W 72/04* | (2009.01) |
| *H04B 17/364* | (2015.01) |
| *H04W 48/18* | (2009.01) |
| *H04W 80/08* | (2009.01) |

(52) U.S. Cl.
CPC ........ *H04W 72/085* (2013.01); *H04B 17/364* (2015.01); *H04W 48/18* (2013.01); *H04W 72/04* (2013.01); *H04W 72/0406* (2013.01); *H04W 72/0413* (2013.01); *H04W 80/08* (2013.01)

(58) Field of Classification Search
CPC .......... H04W 72/085; H04W 72/0406; H04W 72/04; H04W 72/0413; H04W 48/18; H04W 80/08; H04W 72/0453; H04B 17/364

See application file for complete search history.

(56) References Cited

U.S. PATENT DOCUMENTS

| | | | |
|---|---|---|---|
| 2008/0253336 A1 | 10/2008 | Parkvall et al. | |
| 2011/0243012 A1 | 10/2011 | Luo et al. | |

(Continued)

FOREIGN PATENT DOCUMENTS

| | | |
|---|---|---|
| CN | 102196566 A | 9/2011 |
| CN | 102215572 A | 10/2011 |
| EP | 2584819 A1 | 4/2013 |

(Continued)

*Primary Examiner* — Justin T Van Roie
(74) *Attorney, Agent, or Firm* — Womble Bond Dickinson (US) LLP

(57) ABSTRACT

A transmission method is implemented by a communications device including a first functional entity and a second functional entity. A first carrier is configured for the first functional entity, and a second carrier is configured for the second functional entity. The second functional entity obtains first information, where the first information is first control information of the first functional entity, or is the first control information and second control information of the second functional entity, the first control information includes a first identifier, and the first identifier is used to indicate the first carrier; and the second functional entity sends the first information by using the second carrier.

12 Claims, 8 Drawing Sheets

(56) References Cited

U.S. PATENT DOCUMENTS

2013/0083766 A1* 4/2013 Chung .............. H04W 72/0413
370/329
2014/0126433 A1 5/2014 Yang et al.

FOREIGN PATENT DOCUMENTS

| KR | 20120118508 A | 10/2012 |
| KR | 20140034290 A | 3/2014 |
| KR | 20160011231 A | 1/2016 |

* cited by examiner

METHOD AND APPARATUS FOR TRANSMITTING CONTROL INFORMATION

CROSS-REFERENCE TO RELATED APPLICATIONS

This application is a continuation of International Application No. PCT/CN2016/079420, filed on Apr. 15, 2016, the disclosure of which is hereby incorporated by reference in its entirety.

TECHNICAL FIELD

The present disclosure relates to the communications field, and in particular, to a method and an apparatus for transmitting control information.

BACKGROUND

In a carrier aggregation (CA) technology, two or more carriers are aggregated for data transmission and can support a higher bandwidth. These aggregated carriers may serve one user terminal at the same time to receive and transmit data.

With the development of wireless communications technologies, an enhanced technology, to be specific, a dual connectivity (DC) technology of the CA technology, is introduced in a Long Term Evolution (LTE) communications system. In the dual connectivity technology, carrier aggregation is performed between base stations, and a non-ideal backhaul connection is established between base stations.

In the DC technology, downlink service data may be separately carried on one carrier, for transmission, or may be split in a packet data convergence protocol (PDCP) layer, so that the downlink service data is carried on different carriers, for transmission. Uplink service data can only be separately carried on one carrier, for transmission. In other words, uplink service data transmitted by a user terminal can be transmitted on only one carrier. Each protocol layer generates control information corresponding to the protocol layer. The control information includes status information generated by the protocol layer and/or feedback information generated by the protocol layer after downlink service data is received.

In the prior art, after each protocol layer generates control information, the generated control information is carried on a carrier configured in the protocol layer, for transmission. In this way, control information needs to be sent on all carriers that carry downlink service data and that are in an entire communications system, resulting in relatively high air interface overheads and reduced transmission performance of the communications system.

SUMMARY

Embodiments of the present disclosure provide a method and an apparatus for transmitting control information, to reduce air interface overheads of a communications system and improve transmission performance of the communications system.

The following technical solutions are used in the embodiments of the present disclosure to achieve the foregoing objective.

According to a first aspect, an embodiment of the present disclosure provides a method for transmitting control information. The transmission method is implemented by a first communications device including a first functional entity and a second functional entity. A first carrier is configured for the first functional entity. A second carrier is configured for the second functional entity. After obtaining first control information of the first functional entity including a first identifier, the second functional entity sends, by using the second carrier, the first control information obtained by the second functional entity to a second communications device. The first identifier is used to indicate the first carrier.

In the method for transmitting control information provided in this embodiment of the present disclosure, the first carrier is configured for the first functional entity in the first communications device, and the second carrier is configured for the second functional entity in the first communications device. After obtaining the first control information of the first functional entity including the first identifier, the second functional entity sends the first control information by using the second carrier. In this way, the first control information is no longer sent by using the first carrier, and control information sent by the first communications device occupies only resources of the second carrier, thereby reducing air interface overheads of a communications system and improving transmission performance of the communications system.

Further, the first control information is no longer sent by using the first carrier. Therefore, load of the first carrier is reduced, and overheads of the first carrier are reduced.

Optionally, in this embodiment of the present disclosure, a method for obtaining the first control information of the first functional entity by the second functional entity is: receiving, by the second functional entity, first information sent by the first functional entity, and adding the first identifier to the first information to generate the first control information, where the first information is feedback information or is status information or is the feedback information and the status information, the feedback information is information that corresponds to first service data and that is generated by the first functional entity after the first functional entity receives the first service data by using the first carrier, and the status information is information generated by the first functional entity based on a preset mechanism.

Optionally, in this embodiment of the present disclosure, a method for obtaining the first control information of the first functional entity by the second functional entity is: receiving, by the second functional entity, the first control information sent by the first functional entity, where the first control information includes the first identifier and the first information, the first information is feedback information or is status information or is the feedback information and the status information, the feedback information is information that corresponds to first service data and that is generated by the first functional entity after the first functional entity receives the first service data by using the first carrier, and the status information is information generated by the first functional entity based on a preset mechanism.

It can be learned that the second functional entity may obtain the first information first and then add the first identifier to the first information to generate the first control information or may directly receive the first control information sent by the first functional entity. Regardless of which manner is used to obtain the first control information, the second functional entity can learn, based on the first identifier, that the first control information corresponds to the first carrier.

Further, in this embodiment of the present disclosure, before the second functional entity obtains the first control information of the first functional entity, the second functional entity further obtains a control information transmission rule. The control information transmission rule is used to instruct the second functional entity to send the first control information by using the second carrier.

It may be understood that the second functional entity obtains the control information transmission rule in advance, and the second functional entity may determine, based on the control information transmission rule, that after obtaining the first control information, the second functional entity sends the obtained first control information by using the second carrier.

Optionally, if the communications device is a base station apparatus, the base station apparatus further includes a third functional entity.

The third functional entity determines the control information transmission rule when determining that an attribute value of the first carrier and an attribute value of the second carrier both satisfy a preset condition, and sends, to the second functional entity, the control information transmission rule determined by the third functional entity. In this way, the second functional entity may obtain the control information transmission rule.

Optionally, if the communications device is a user terminal, the user terminal communicates with a base station apparatus, and the first carrier and the second carrier are configured for the base station apparatus, a method for obtaining the control information transmission rule by the second functional entity is: receiving, by the second functional entity, the control information transmission rule sent by the base station apparatus, where the control information transmission rule is determined by the base station apparatus when the base station apparatus determines that an attribute value of the first carrier and an attribute value of the second carrier both satisfy a preset condition.

As can be learned from the foregoing description, regardless of whether the communications device is a base station apparatus or a user terminal, in this embodiment of the present disclosure, the device that determines the control information transmission rule is a base station apparatus, and the base station apparatus determines the control information transmission rule when the attribute value of the first carrier and the attribute value of the second carrier both satisfy the preset condition.

The preset condition includes at least one of a first condition, a second condition, or a third condition; the first condition is that a transmit time interval (TTI) of the first carrier is greater than a first preset threshold, a TTI of the second carrier is less than or equal to a second preset threshold, and the first preset threshold is greater than or equal to the second preset threshold; the second condition is that signal quality of the first carrier is less than a third preset threshold, signal quality of the second carrier is greater than a fourth preset threshold, and the fourth preset threshold is greater than the third preset threshold; and the third condition is that load of the first carrier is greater than a fifth preset threshold, load of the second carrier is less than a sixth preset threshold, and the fifth preset threshold is greater than the sixth preset threshold.

It can be learned from the foregoing conditions that regardless of whether an attribute value of a carrier is a TTI or signal quality or load, the foregoing conditions may be understood as that performance of the second carrier is better than performance of the first carrier. With reference to the foregoing description, the base station apparatus determines the control information transmission rule only when the performance of the second carrier is better than the performance of the first carrier. In this way, even if the first control information is sent by using the second carrier, the second carrier is not severely affected.

Further, in the transmission method provided in this embodiment of the present disclosure, the second functional entity further obtains second control information of the second functional entity, and sends the second control information by using the second carrier.

The second control information is second information or the second control information is the second information and a second identifier. The second information is information that corresponds to second service data and that is generated by the second functional entity after the second functional entity receives the second service data by using the second carrier, or, the second information is information generated by the second functional entity based on a preset mechanism, and the second identifier is used to indicate the second carrier.

It is easily understood that at a moment, the second functional entity may obtain only the first control information, or may obtain only the second control information, or may obtain both the first control information and the second control information. After obtaining the first control information and/or the second control information, the second functional entity in this embodiment of the present disclosure sends, by using the second carrier, the information obtained by the second functional entity.

Further, the transmission method provided in this embodiment of the present disclosure further includes: first, receiving, by the second functional entity by using the second carrier, third control information sent by the second communications device, where the third control information includes the first identifier; and then, sending, by the second functional entity, the third control information to the first functional entity based on the first identifier.

It may be understood that the first communications device in this embodiment of the present disclosure may be a transmit end device of control information or may be a receive end device of control information. If the first communications device is a receive end device of control information, the second functional entity in the first communications device may receive, by using the second carrier, the third control information that is sent by the second communications device and that includes the first identifier. The second functional entity learns, based on the first identifier, that a target functional entity of the third control information should be the first functional entity. In this way, the second functional entity sends the third control information to the first functional entity.

According to a second aspect, another embodiment of the present disclosure provides a communications device, where the communications device includes a first functional entity and a second functional entity, a first carrier is configured for the first functional entity, and a second carrier is configured for the second functional entity.

Functions of the first functional entity and the second functional entity are implemented by using a corresponding software program and/or application module. The first functional entity includes a generation module and a second sending module, and the second functional entity includes an obtaining module, a first sending module, and a processing module.

Functions implemented by the unit modules provided in this embodiment of the present disclosure are as follows:

The obtaining module is configured to obtain first control information of the first functional entity, where the first control information includes a first identifier, and the first identifier is used to indicate the first carrier.

The first sending module is configured to send, by using the second carrier, the first control information obtained by the obtaining module to another communications device.

For technical effects of the communications device provided in this embodiment of the present disclosure, refer to the technical effects of the first communications device described in the method for transmitting control information performed by the first communications device in the foregoing embodiment of the present disclosure, and details are not described herein again.

Further, the generation module is configured to generate first information, where the first information is feedback information or is status information or is the feedback information and the status information, the feedback information is information that corresponds to first service data and that is generated after the first service data is received by using the first carrier, and the status information is information generated based on a preset mechanism.

Further, the second sending module is configured to send the first information generated by the generation module to the second functional entity.

Further, the obtaining module is configured to receive the first information sent by the second sending module of the first functional entity.

Further, the processing module is configured to add the first identifier to the first information received by the obtaining module, to generate the first control information.

Further, the generation module is configured to generate the first control information, where the first control information includes the first identifier and the first information, the first information is feedback information or is status information or is the feedback information and the status information, the feedback information is information that corresponds to first service data and that is generated by the first functional entity after the first functional entity receives the first service data by using the first carrier, and the status information is information generated by the first functional entity based on a preset mechanism.

Further, the second sending module is configured to send the first control information generated by the generation module to the second functional entity.

Further, the obtaining module is configured to receive the first control information sent by the second sending module of the first functional entity.

Further, the obtaining module is further configured to: before obtaining the first control information, obtain a control information transmission rule, where the control information transmission rule is used to instruct the first sending module of the second functional entity to send the first control information by using the second carrier.

Further, if the first communications device is a base station apparatus, the base station apparatus further includes a third functional entity, and the third functional entity includes a determining module and a third sending module.

The determining module is configured to: when determining that an attribute value of the first carrier and an attribute value of the second carrier both satisfy a preset condition, determine the control information transmission rule.

The third sending module is configured to send the control information transmission rule determined by the determining module to the second functional entity.

Further, the obtaining module of the second functional entity is configured to receive the control information transmission rule sent by the third sending module of the third functional entity.

Further, if the first communications device is a user terminal, the user terminal communicates with a base station apparatus, and the first carrier and the second carrier are configured for the base station apparatus, the obtaining module of the second functional entity is configured to receive the control information transmission rule sent by the base station apparatus, where the control information transmission rule is determined by the base station apparatus when the base station apparatus determines that an attribute value of the first carrier and an attribute value of the second carrier both satisfy a preset condition.

Further, the preset condition includes at least one of a first condition, a second condition, or a third condition; the first condition is that a transmit time interval (TTI) of the first carrier is greater than a first preset threshold, a TTI of the second carrier is less than or equal to a second preset threshold, and the first preset threshold is greater than or equal to the second preset threshold; the second condition is that signal quality of the first carrier is less than a third preset threshold, signal quality of the second carrier is greater than a fourth preset threshold, and the fourth preset threshold is greater than the third preset threshold; and the third condition is that load of the first carrier is greater than a fifth preset threshold, load of the second carrier is less than a sixth preset threshold, and the fifth preset threshold is greater than the sixth preset threshold.

Further, the obtaining module is further configured to receive, by using the second carrier, third control information sent by the another communications device, where the third control information includes the first identifier.

Further, the first sending module of the second functional entity is further configured to send the third control information to the first functional entity based on the first identifier included in the third control information received by the obtaining module.

According to a third aspect, another embodiment of the present disclosure provides a communications device, the communications device includes a memory, a processor, a communication interface, and a system bus. The memory, the processor, and the communication interface are connected by using the system bus. The memory is configured to store a computer instruction. The processor is configured to execute the computer instruction stored in the memory, to enable the communications device to perform the method for transmitting control information in the foregoing embodiment.

Optionally, in the foregoing aspects and the optional implementations of the aspects, if the communications device is a transmit end device of control information, the first functional entity is a Radio Link Control (RLC) entity, and the first information includes an RLC protocol data unit (PDU), the second functional entity is an RLC entity or a first media access control (MAC) entity; or, if the first functional entity is a MAC entity and the first information includes a MAC protocol data unit (PDU), the second functional entity is a MAC entity; or, if the first functional entity is a physical PHY entity and the first information includes PHY control information, the second functional entity is a PHY entity.

Optionally, in the foregoing aspects and the optional implementations of the aspects, if the communications device is a receive end device of control information, the first functional entity is a Radio Link Control (RLC) entity, and the first information includes an RLC protocol data unit PDU, the second functional entity is an RLC entity; or, if the first functional entity is a MAC entity and the first information includes a MAC protocol data unit PDU, the second functional entity is a MAC entity; or, if the first functional entity is a physical (PHY) entity and the first information includes PHY control information, the second functional entity is a PHY entity.

According to a fourth aspect, an embodiment of the present disclosure further provides a computer storage medium, configured to store computer software instructions used in the foregoing communications device, where the computer software instructions include a program designed to perform the transmission method provided in the foregoing aspect.

Optionally, in the foregoing aspects and the optional implementations of the aspects, the communications device provided in this embodiment of the present disclosure may be a user terminal or may be a base station apparatus, and the base station apparatus may include at least one base station.

For technical effects of the communications device provided in this embodiment of the present disclosure, refer to the technical effects of the first communications device described in the method for transmitting control information performed by the first communications device in the foregoing embodiment, and details are not described herein again.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DESCRIPTION OF EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure.

In the specification, claims, and accompanying drawings of the present disclosure, the terms "first", "second", "third", "fourth", and so on are intended to distinguish between different objects but do not limit a particular order. Moreover, the terms "including", "comprising", and any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the following description, specific details such as a particular system structure, an interface, and a technology are set forth in an illustrative but not a restrictive sense to make a thorough understanding of the present disclosure. However, persons skilled in the art should know that the present disclosure may be implemented in other embodiments without these specific details. In other cases, detailed descriptions of well-known mobile devices, circuits, and methods are omitted, so that the present disclosure is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

At present, a wireless communications system is constructed by distributing tasks to be executed to a plurality of protocol layers. Each node or entity in the system is configured to process data in each protocol layer of a protocol stack. Conceptually, corresponding protocol layers may communicate with each other.

Figure 1:
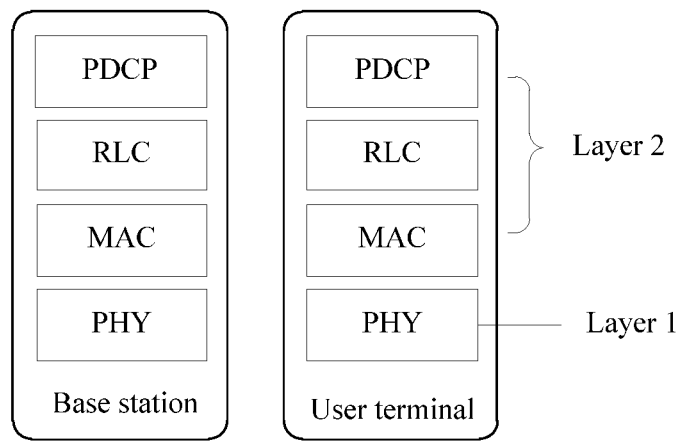
FIG. 1 is a protocol stack used in an existing wireless communications system.

FIG. 1 shows a protocol stack that includes a layer 1 protocol and a layer 2 protocol in two nodes that are based on an LTE communications system. The two nodes are a user terminal and a base station. The layer 1 protocol is a physical layer (PHY layer) protocol. A major effect of the PHY layer is to perform mapping from service data to a physical channel. The layer 2 protocol includes a media access control (MAC) protocol layer, a Radio Link Control (RLC) protocol layer, and a PDCP layer. A major effect of the MAC layer is to manage a hybrid automatic repeat request (HARM) function and schedule service data. A major effect of the RLC layer is to segment/cascade, retransmit, and sequentially submit service data. A major effect of the PDCP layer is to compress and decompress an Internet Protocol (IP) header of service data and transmit the service data.

Figure 2:
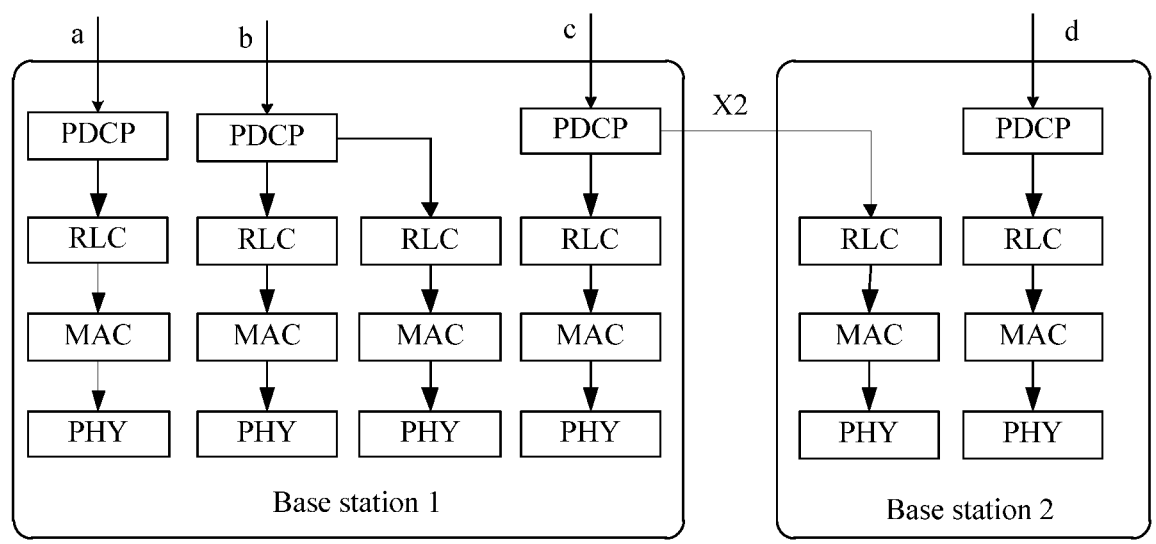
FIG. 2 is a schematic flowchart of transmitting downlink service data in an existing wireless communications system.

FIG. 2 is a schematic flowchart of transmitting downlink service data in each protocol layer of a base station when the base station sends downlink service data by using a DC technology. The downlink service data may be separately carried on one carrier, for transmission (for example, downlink service data a is carried on one carrier of a base station 1, for transmission, and downlink service data d is carried on one carrier of a base station 2, for transmission), or may be split in the PDCP layer, so that the downlink service data is carried on different carriers, for transmission (for example, downlink service data b is carried on different carriers of the base station 1, for transmission, and downlink service data c is carried on carriers of the base station 1 and the base station 2, for transmission). Different carriers that carry same downlink service data may belong to a same base station (for example, two carriers that carry the downlink service data b belong to the base station 1) or may belong to different base stations (for example, one of two carriers that carry the downlink service data c belongs to the base station 1, and the other belongs to the base station 2). X2 in FIG. 2 refers to an X2 interface between the base station 1 and the base station 2.

It should be noted that a procedure of transmitting downlink service data in each protocol layer of the base station shown in FIG. 2 is only an example of a procedure of a method for sending downlink service data by the base station by using a DC technology. It does not mean that the base station needs to use all the foregoing procedures to send downlink service data during actual application.

In the prior art, in each protocol layer, control information corresponding to the protocol layer is generated, and the generated control information is carried on a carrier configured for the protocol layer, for transmission. In this way, control information needs to be sent on all carriers that carry downlink service data in an entire communications system, resulting in relatively high air interface overheads and reduced transmission performance of the communications system.

Figure 3:
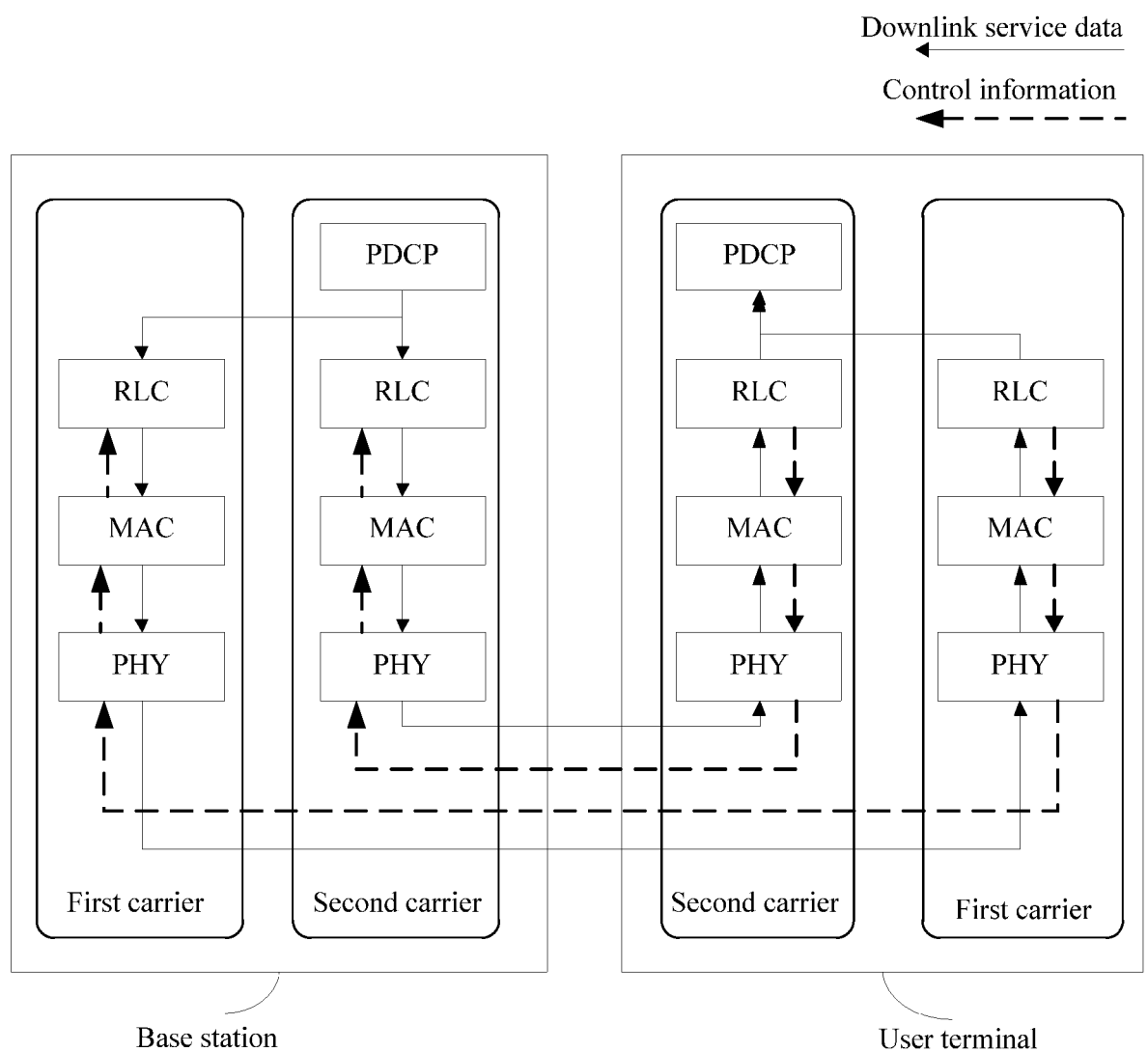
FIG. 3 is a schematic flowchart of transmitting downlink service data and control information in an existing wireless communications system.

FIG. 3 is a schematic flowchart of transmitting downlink service data and control information in a protocol layer structure in the prior art. Downlink service data (including first downlink service data and second downlink service data) in a base station is split in a PDCP layer of a second carrier to a first carrier. The first downlink service data is sent to the user terminal by using an RLC layer, a MAC layer, and a PHY layer of the first carrier. The second downlink service data is sent to the user terminal by using an RLC layer, a MAC layer, and a PHY layer of the second carrier. The RLC layer, the MAC layer, and the PHY layer of the first carrier in the user terminal all generate corresponding control information, and the control information is sent to the base station by using the first carrier. Similarly, the RLC layer, the MAC layer, and the PHY layer of the second carrier in the user terminal all generate corresponding control information, and the control information is sent to the base station by using the second carrier. In this way, control information needs to be transmitted on both the first carrier and the second carrier in the communications system, resulting in relatively high air interface overheads and reduced transmission performance of the communications system.

For the foregoing problem, embodiments of the present disclosure provide a method and an apparatus for transmitting control information. Control information that needs to be sent by using a plurality of different carriers is sent by using one of the carriers, thereby reducing air interface overheads of a communications system and improving transmission performance of the communications system.

In particular, for a carrier that carries a tiny amount of uplink service data (or does not carry uplink service data) and carries a large amount of downlink service data, control information corresponding to the carrier may be sent by using another carrier, so that load of this carrier is reduced.

The technology described in this embodiment of the present disclosure may be used in various communications systems, for example, an LTE communications system, a fifth-generation mobile communication technology (the 5th Generation Mobile Communication Technology, 5G) communications system, a communications system in which a plurality of radio access technologies (RAT) coexist or another similar communications system.

The method for transmitting control information provided in this embodiment of the present disclosure is applicable to a multi-connectivity technology for implementing an ideal backhaul connection between different base stations, where the multi-connectivity technology for implementing an ideal backhaul connection between different base stations includes a DC technology for implementing an ideal backhaul connection between different base stations.

The DC technology for implementing an ideal backhaul connection between different base stations is only an explanation for convenience of understanding this embodiment of the present disclosure. During actual use, such a technology may have another name. This is not limited in this embodiment of the present disclosure.

Figure 4:
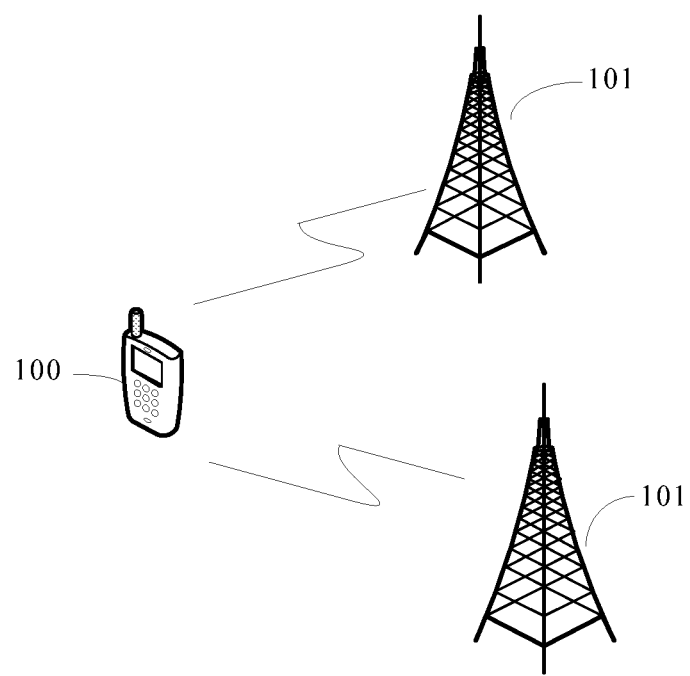
FIG. 4 is a schematic structural diagram of a communications system according to an embodiment of the present disclosure.

FIG. 4 is a schematic structural diagram of a communications system according to an embodiment of the present disclosure. Referring to FIG. 4, the communications system includes a user terminal 100 and one or more base stations 101 connected to the user terminal 100. The user terminal 100 and the base station 101 are connected by using a network.

With reference to FIG. 4, a first communications device in this embodiment of the present disclosure may be the user terminal 100, or may be a base station apparatus that includes at least one the base station 101.

If the first communications device is the user terminal 100, the user terminal 100 includes a first functional entity and a second functional entity, a first carrier is configured for the first functional entity, and a second carrier is configured for the second functional entity.

The first functional entity of the user terminal 100 is an RLC entity for which a first carrier is configured, or is a MAC entity for which a first carrier is configured, or is a PHY entity for which a first carrier is configured.

The second functional entity of the user terminal 100 is an RLC entity for which a second carrier is configured, or is a MAC entity for which a second carrier is configured, or is a PHY entity for which a second carrier is configured.

After obtaining first control information of the first functional entity of the user terminal 100, the second functional entity of the user terminal 100 sends, by using the second carrier, the first control information to the base station 101 that communicates with the user terminal 100. The first control information includes a first identifier indicating the first carrier. The second functional entity of the user terminal 100 can recognize the first control information based on the first identifier. After receiving the first control information sent by the user terminal 100, the base station 101 can determine a target functional entity of the first control information based on the first identifier included in the first control information.

The first identifier may be a logic channel identification (LCH ID) of the first carrier, or may be a name of the first carrier, or may be other information used to represent the first carrier, and more examples are not listed herein.

Optionally, the second functional entity of the user terminal 100 may further obtain second control information of the second functional entity, and send, by using the second carrier, the second control information to the base station 101 that communicates with the user terminal 100.

Optionally, the second functional entity of the user terminal 100 may further receive third control information that is sent by the base station 101 and that includes the first identifier, and send the third control information to the first functional entity of the user terminal 100 based on the first identifier. To be specific, if the user terminal 100 is a receive end device of control information, the second functional entity of the user terminal 100 may further determine, based on the first identifier, the target functional entity of the first control information.

If the first communications device is a base station apparatus, the base station apparatus further includes the first functional entity and the second functional entity, the first carrier is configured for the first functional entity, and the second carrier is configured for the second functional entity.

Similarly, the first functional entity of the base station apparatus is an RLC entity for which a first carrier is configured, or is a MAC entity for which a first carrier is configured, or is a PHY entity for which a first carrier is configured.

The second functional entity of the base station apparatus is an RLC entity for which a second carrier is configured, or is a MAC entity for which a second carrier is configured, or is a PHY entity for which a second carrier is configured.

Functions completed by the first functional entity of the base station apparatus are similar to those completed by the first functional entity of the user terminal 100. Functions completed by the second functional entity of the base station apparatus are similar to those completed by the second functional entity of the user terminal 100. The functions are not described in detail herein. The first functional entity of the base station apparatus and the second functional entity of the base station apparatus may belong to a same base station 101 or may belong to different base stations 101.

The user terminal used in this embodiment of the present disclosure is a wireless terminal. The wireless terminal may be a device that provides a user with speech and/or data connectivity, a handheld device having a wireless connection function, or another processing device connected to a wireless modem. The wireless terminal may communicate with one or more core networks by using a radio access network (RAN). The wireless terminal may be a mobile terminal, for example, a mobile phone (or referred to as a "cellular" phone) or a computer having a mobile terminal, or may be a portable mobile apparatus, a pocket-sized mobile apparatus, a handheld mobile apparatus, a computer built-in mobile apparatus or an in-vehicle mobile apparatus which exchanges speech and/or data with a radio access network, for example, a device such as a personal communication service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user agent, a user device, or user equipment.

For convenient understanding of the method for transmitting control information provided in this embodiment of the present disclosure, this embodiment of the present disclosure is described by using an example in which the user terminal includes the first functional entity and the second functional entity, the first carrier is configured for the first functional entity of the user terminal, the second carrier is configured for the second functional entity of the user terminal, the base station apparatus also includes the first functional entity and the second functional entity, the first carrier is also configured for the first functional entity of the base station apparatus, the second carrier is also configured for the second functional entity of the base station apparatus, communication is completed between the user terminal and the base station apparatus, the base station apparatus sends first downlink service data to the user terminal by using the first carrier, and sends second downlink service data to the user terminal by using the second carrier, and the user terminal sends control information to the base station apparatus. In this way, with reference to the foregoing content, the user terminal in this embodiment of the present disclosure is the first communications device, and the base station apparatus is a second communications device.

Figure 5:
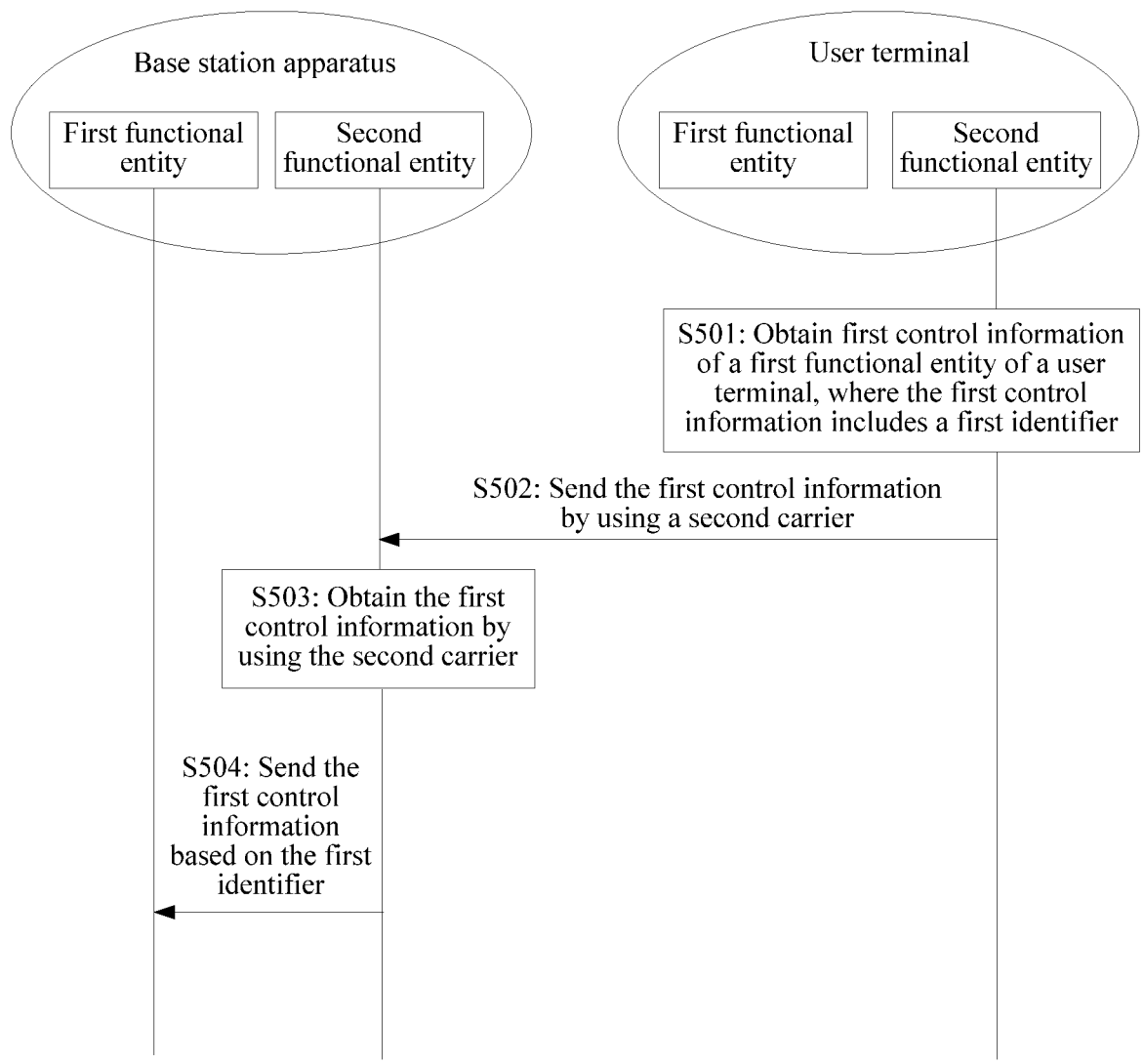
FIG. 5 is a schematic flowchart 1 of a method for transmitting control information according to an embodiment of the present disclosure.

As shown in FIG. 5, a method for transmitting control information provided in an embodiment of the present disclosure includes the following operations.

S501: A second functional entity of a user terminal obtains first control information of a first functional entity of the user terminal, where the first control information includes a first identifier.

The first identifier is used to indicate a first carrier.

S502: The second functional entity of the user terminal sends the first control information to a second functional entity of a base station apparatus by using a second carrier.

S503: The second functional entity of the base station apparatus obtains the first control information by using the second carrier.

S504: The second functional entity of the base station apparatus sends the first control information to the first functional entity of the base station apparatus based on the first identifier included in the first control information.

Optionally, in this embodiment of the present disclosure, a method for obtaining the first control information by the second functional entity of the user terminal may be: receiving, by the second functional entity of the user terminal, first information sent by the first functional entity of the user terminal, and adding the first identifier used to indicate the first carrier to the received first information.

The first information is feedback information or is status information or is the feedback information and the status information. The feedback information is information that corresponds to first downlink service data and that is generated by the first functional entity of the user terminal after the first functional entity of the user terminal receives, by using the first carrier, the first downlink service data sent by a base station. The status information is information generated by the first functional entity of the user terminal based on a preset mechanism.

For example, if the first functional entity of the user terminal is an RLC entity and the base station apparatus uses an RLC AM (Acknowledged Mode) mode to send the first downlink service data to the user terminal, after receiving, by using the first carrier, the first downlink service data sent by the base station, the RLC entity generates feedback information corresponding to the first downlink service data. The feedback information is an RLC PDU. The RLC PDU is used to feed back a sequence number corresponding to the RLC PDU that is received by the RLC entity correctly or not.

The preset mechanism in this embodiment of the present disclosure is determined based on actual application and a protocol that is satisfied by the first functional entity of the user terminal. This is not limited in this embodiment of the present disclosure.

For example, if the first functional entity of the user terminal is a MAC entity, when the MAC entity finds that high layer data needs to be sent, the MAC entity generates status information. The status information is a buffer status report (BSR). The BSR is used to feed back how much data needs to be sent by the user terminal on a carrier configured for the MAC entity.

It should be noted that the first information in this embodiment of the present disclosure is one data packet. In this embodiment of the present disclosure, the data packet is named the first information only for convenience of understanding and description. During actual use, the name of the first information is different based on a variation of the first functional entity. This is not limited in this embodiment of the present disclosure.

Optionally, the first identifier may be an LCH ID of the first carrier, or may be a name of the first carrier, or may be other information used to represent the first carrier, and descriptions are not provided herein by using examples one by one in this embodiment of the present disclosure.

In this embodiment of the present disclosure, the first identifier added by the second functional entity of the user terminal to the first information may be placed in a packet header of the first information, or may be placed in a payload of the first information. This is not limited in this embodiment of the present disclosure.

Optionally, in this embodiment of the present disclosure, a method for obtaining the first control information by the second functional entity of the user terminal may be: receiving, by the second functional entity of the user terminal, the first control information sent by the first functional entity of the user terminal.

The first control information includes the first identifier used to indicate the first carrier and the first information. The definition of the first information is the same as the foregoing definition of the first information. Details are not described herein again.

As can be learned with reference to the foregoing definition of the first information, the first information is generated by the first functional entity of the user terminal. Therefore, the first control information sent by the first functional entity of the user terminal is the first identifier added to the first information generated by the first functional entity of the user terminal after the first functional entity generates the first information. The first functional entity of the user terminal then sends the first control information including the first identifier and the first information to the second functional entity of the user terminal.

The first identifier added by the first functional entity of the user terminal to the first information is the same as the first identifier added by the second functional entity of the user terminal to the first information. Details are not described herein again.

Similarly, in this embodiment of the present disclosure, the first identifier added by the first functional entity of the user terminal to the first information may be placed in a packet header of the first information or may be placed in a payload of the first information. This is not limited in this embodiment of the present disclosure.

In addition, the second functional entity of the user terminal in this embodiment of the present disclosure may further obtain second control information of the second functional entity of the user terminal. The second control information may be second information that corresponds to second service data and that is generated by the second functional entity of the user terminal after the second functional entity of the user terminal receives, by using the second carrier, the second service data sent by the base station. The second control information may alternatively be the second information generated by the second functional entity based on the preset mechanism. The second control information may further include the second information and a second identifier that is used to indicate the second carrier.

It is easily understood that the first control information already includes the first identifier used to indicate the first carrier. Therefore, regardless of whether the second control information includes the second identifier used to indicate the second carrier, the second functional entity of the user terminal may distinguish between the first control information and the second control information based on the first identifier.

In this embodiment of the present disclosure, the second functional entity of the user terminal may obtain the second control information before obtaining the first control information, or may obtain the second control information after obtaining the first control information, or may obtain the first control information and the second control information at the same time. This is not limited in this embodiment of the present disclosure.

Optionally, if the first functional entity of the user terminal is an RLC entity in this embodiment of the present disclosure, the first information in this embodiment of the present disclosure includes an RLC PDU and the second functional entity of the user terminal is an RLC entity or a MAC entity.

Any RLC entity in the foregoing performs data processing based on an existing RLC protocol. The foregoing MAC entity performs data processing based on an existing MAC protocol.

If the first functional entity of the user terminal is an RLC entity and the second functional entity of the user terminal is an RLC entity, the first functional entity of the user terminal sends the RLC PDU generated by the first functional entity to the second functional entity of the user terminal. Such a scenario is interaction between peer protocol layers and is the same as that in the prior art. This is not explained in detail herein.

In addition, if the first functional entity of the user terminal is an RLC entity and the second functional entity of the user terminal is a MAC entity, the first functional entity of the user terminal may send the RLC PDU generated by the first functional entity to the second functional entity of the user terminal.

An existing MAC functional entity is responsible for scheduling data of an RLC functional entity. Therefore, if the first functional entity of the user terminal is an RLC entity and the second functional entity of the user terminal is a MAC entity in this embodiment of the present disclosure, the MAC entity may schedule control information from the first functional entity of the user terminal. After generating the RLC PDU, the first functional entity of the user terminal sends the RLC PDU generated by the first functional entity to the second functional entity of the user terminal.

Optionally, if the first functional entity of the user terminal is a MAC entity, the first information includes a MAC PDU and the second functional entity of the user terminal is a MAC entity.

Optionally, if the first functional entity of the user terminal is a PHY entity, the first information includes PHY control information and the second functional entity of the user terminal is a PHY entity.

It should be noted that the RLC entity is a term of a third Generation Partnership Project (3rd Generation Partnership Project, 3GPP) network, and a functional entity having a similar function may exist in another non-3GPP network but is not named an RLC entity. For example, a logic link control (LLC) layer in a Wireless-Fidelity (Wi-Fi) system has a function similar to that of an RLC entity in a 3GPP network. Therefore, the RLC entity in this embodiment of the present disclosure is used to represent a functional entity having a similar function.

Similarly, the MAC entity in this embodiment of the present disclosure is used to represent a functional entity having a function similar to that of a MAC functional entity in a 3GPP network, and the PHY entity is used to represent a functional entity having a function similar to a PHY functional entity in a 3GPP network.

Further, after obtaining the first control information, the second functional entity of the user terminal adds the obtained first control information to the second carrier, and sends the first control information to the base station apparatus. In other words, the second functional entity of the user terminal sends the first control information to the base station apparatus by using the second carrier, that is, performs S502.

Optionally, after obtaining the second control information, the second functional entity of the user terminal also adds the second control information to the second carrier, and sends the second control information to the base station.

It should be noted that an order of sending the first control information and the second control information by the second functional entity of the user terminal is not limited in this embodiment of the present disclosure. If the second functional entity of the user terminal obtains the first control information first, the second functional entity of the user terminal sends the first control information first. If the second functional entity of the user terminal obtains the second control information first, the second functional entity of the user terminal sends the second control information first. If the second functional entity of the user terminal obtains the first control information and the second control information at the same time, the second functional entity of the user terminal sends the first control information and the second control information at the same time.

For example, if the second functional entity of the user terminal is a PHY entity and the PHY entity obtains first PHY control information and second PHY control information at the same time, the PHY entity sends the first PHY control information and the second PHY control information to the base station apparatus at the same time by using the second carrier.

Optionally, in the previous example, when the PHY entity sends the first PHY control information and the second PHY control information to the base station at the same time by using the second carrier, the PHY entity first encodes the first PHY control information and the second PHY control information based on a preset encoding manner and then sends the encoded information.

For example, the PHY entity encodes the first PHY control information and the second PHY control information based on a preset bit sequence. The PHY entity then sends the first PHY control information and the second PHY control information at the same time in a transmit time interval (TTI)/some TTIs of the second carrier.

By using the foregoing transmission method, the first control information is no longer sent by using the first carrier, so that load of the first carrier is reduced, and overheads of the first carrier are reduced. The first control information and the second control information are both sent by using the second carrier. In this way, air interface overheads of a communications system are reduced, and transmission performance of the communications system is improved.

It is easily understood that this embodiment of the present disclosure is described by using only an example of a first carrier and a second carrier in a communications system. The communications system may include at least two carriers. In this way, the first carrier and the second carrier are any two carriers in the communications system. For a communications system including at least two carriers, by using the transmission method provided in this embodiment of the present disclosure, air interface overheads of the communications system can be reduced and transmission performance of the communications system can be improved.

In particular, if the first carrier carries a tiny amount of uplink service data (or does not carry uplink service data) and carries a large amount of first downlink service data in this embodiment of the present disclosure, by using the transmission method provided in this embodiment of the present disclosure, the first control information corresponding to the first carrier is sent by using the second carrier. In this way, overheads of the first carrier can be reduced and load of the first carrier can be reduced.

The second carrier is configured for the second functional entity of the base station apparatus in this embodiment of the present disclosure. Therefore, the second functional entity of the base station apparatus obtains the first control information by using the second carrier, that is, performs S503.

After obtaining the first control information, the base station apparatus can learn, based on the first identifier included in the first control information, that a target functional entity of the first control information is the first functional entity of the base station apparatus. Therefore, the second functional entity of the base station apparatus sends the first control information to the first functional entity of the base station apparatus based on the first identifier, that is, performs S504.

It can be learned that the first control information in this embodiment of the present disclosure is transmitted by using the second carrier, so that load of the first carrier is reduced and overheads of the first carrier are reduced.

It should be noted that the method for transmitting control information provided in this embodiment of the present disclosure may be applicable to any functional entity in the user terminal and the base station apparatus, and may be applicable to all functional entities in the user terminal and the base station apparatus.

The first carrier and the second carrier in this embodiment of the present disclosure may belong to a same RAT technology or may belong to different RAT technologies.

The base station apparatus in this embodiment of the present disclosure includes at least one base station. The first functional entity of the base station apparatus and the second functional entity of the base station apparatus may belong to a same base station or may belong to different base stations.

The base station apparatus is only an explanation for convenience of description and understanding in this embodiment of the present disclosure. During actual use, an apparatus that includes at least one base station may have another name. This is not limited in this embodiment of the present disclosure.

An application scenario in which the first functional entity of the base station apparatus and the second functional entity of the base station apparatus belong to different base stations may be a coordinated multipoint transmission/reception (CoMP) scenario or may be a scenario of a base station network (for example, a network of macro base stations and micro base stations).

Further, before the second functional entity of the user terminal obtains the first control information of the first functional entity of the user terminal, the second functional entity of the user terminal in the method for transmitting control information provided in this embodiment of the present disclosure further obtains a control information transmission rule used to instruct the second functional entity of the user terminal to send the first control information by using the second carrier.

Figure 6:
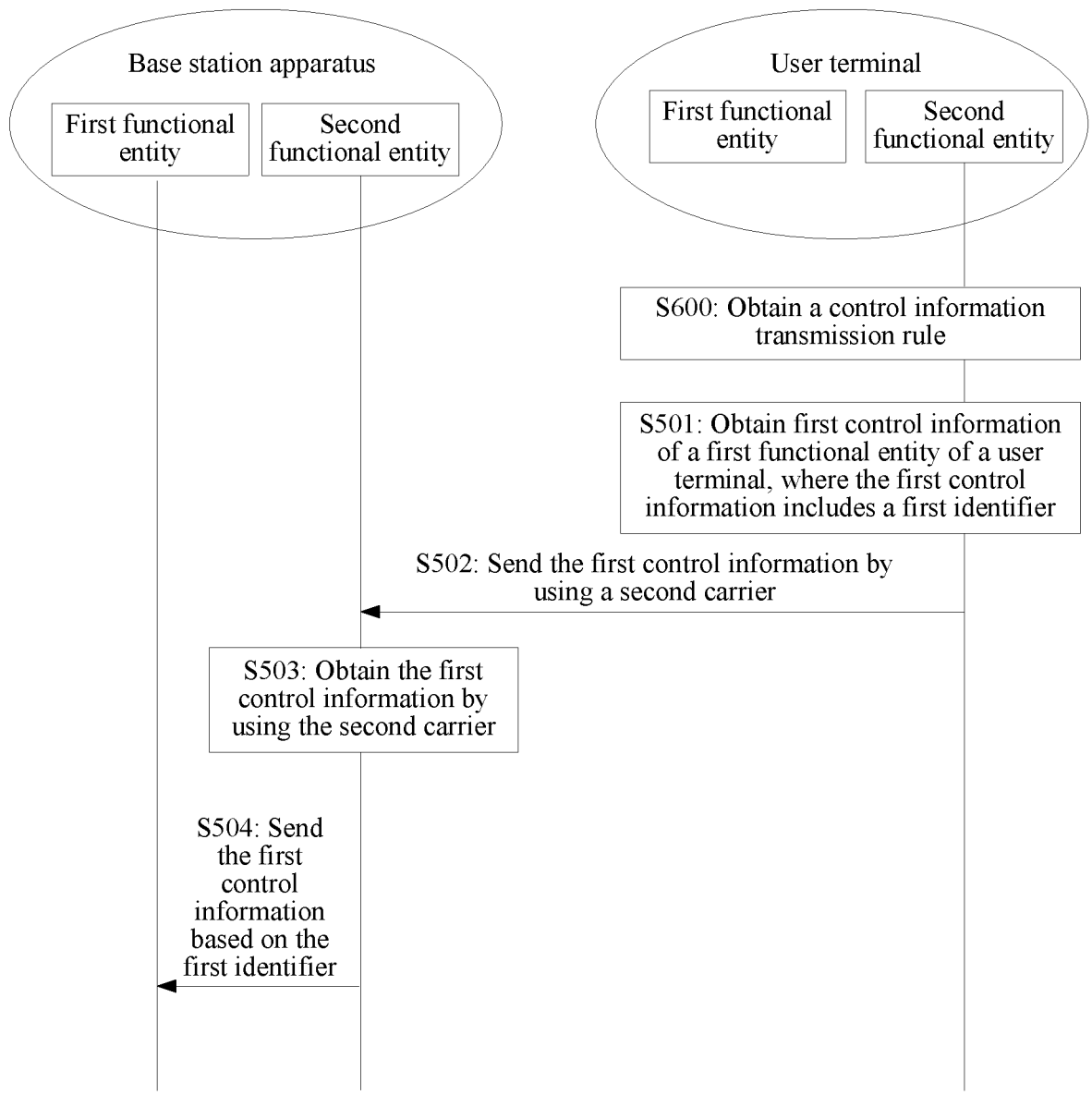
FIG. 6 is a schematic flowchart 2 of a method for transmitting control information according to an embodiment of the present disclosure.

As shown in FIG. 6, before S501, the method for transmitting control information provided in this embodiment of the present disclosure further includes the following operations.

S600: The second functional entity of the user terminal obtains the control information transmission rule.

The control information transmission rule is used to instruct the second functional entity of the user terminal to send the first control information by using the second carrier.

A method for obtaining the control information transmission rule by the second functional entity of the user terminal is: obtaining, by the second functional entity of the user terminal, the control information transmission rule sent by the base station apparatus, where the control information transmission rule is determined by the base station apparatus when the base station apparatus determines that an attribute value of the first carrier and an attribute value of the second carrier both satisfy a preset condition.

The base station apparatus may send the control information transmission rule to the user terminal by using a Radio Resource Control (RRC) message, MAC information or PHY control information.

The preset condition in this embodiment of the present disclosure may be any one of the following conditions:

1. A TTI of the first carrier is greater than a first preset threshold, a TTI of the second carrier is less than or equal to a second preset threshold, and the first preset threshold is greater than or equal to the second preset threshold.

For example, if the control information in this embodiment of the present disclosure is channel state information (CSI), when the TTI of the first carrier is greater than the first preset threshold and the TTI of the second carrier is less than or equal to the second preset threshold, a feedback cycle of CSI of the second carrier may be set to be greatly less than a feedback cycle of CSI of the first carrier. If the user terminal sends the CSI of the first carrier to the base station apparatus by using the second carrier, the base station apparatus can densely receive the CSI of the first carrier by using the second carrier. In this way, the base station apparatus can more accurately learn a channel condition during data transmission by using the first carrier. Even if the feedback cycle of the CSI of the first carrier is the same as the feedback cycle of the CSI of the second carrier, because the TTI of the second carrier is shorter, if the user terminal sends the CSI of the first carrier to the base station apparatus by using the second carrier, the base station apparatus can also densely receive the CSI of the first carrier by using the second carrier, and the base station apparatus can also more accurately learn a channel condition during data transmission by using the first carrier. After learning a channel condition during data transmission by using the first carrier, the base station apparatus may send downlink service data to the user terminal based on the channel condition, so that scheduling performance during transmission of downlink service data by using the first carrier is improved.

If the control information in this embodiment of the present disclosure is information about an RLC PDU, when the TTI of the first carrier is greater than the first preset threshold and the TTI of the second carrier is less than or equal to the second preset threshold, if the user terminal sends the RLC PDU of the first carrier by using the second carrier, the base station apparatus can more quickly receive the RLC PDU of the first carrier by using the second carrier. The base station apparatus can more quickly determine, based on the received RLC PDU of the first carrier, whether the user terminal correctly receives service data sent by the base station apparatus by using the first carrier, so that the base station apparatus increases a speed of sending service data to the user terminal by using the first carrier, thereby improving a throughput of the first carrier.

2. Signal quality of the first carrier is less than a third preset threshold, signal quality of the second carrier is greater than a fourth preset threshold, and the fourth preset threshold is greater than the third preset threshold.

It is easily understood that if the signal quality of the first carrier is less than the signal quality of the second carrier, the user terminal sends the first control information by using the second carrier, thereby helping to improve a signal-to-noise ratio of the first control information obtained by a base station.

3. Load of the first carrier is greater than a fifth preset threshold, load of the second carrier is less than a sixth preset threshold, and the fifth preset threshold is greater than the sixth preset threshold.

It is easily understood that if the load of the first carrier is greater than the load of the second carrier, the user terminal sends the first control information by using the second carrier, so that a carrier resource can be effectively utilized and a probability that the first carrier is overloaded is reduced.

4. Any set of the foregoing methods 1, 2, and 3.

It is easily understood that if the preset condition in this embodiment of the present disclosure is a set of the foregoing conditions, the user terminal sends the first control information by using the second carrier, so that a signal-to-noise ratio of the transmitted first control information can be improved, the reliability of the first control information is ensured and a utilization ratio of a carrier resource is improved at the same time.

It can be learned that the base station apparatus determines the control information transmission rule based on attribute values of different carriers during actual application.

It is easily understood that during actual application, for different user terminals, attribute values of carriers are usually not the same. Therefore, for different user terminals, control information transmission rules determined by the base station apparatus are different.

Figure 7:
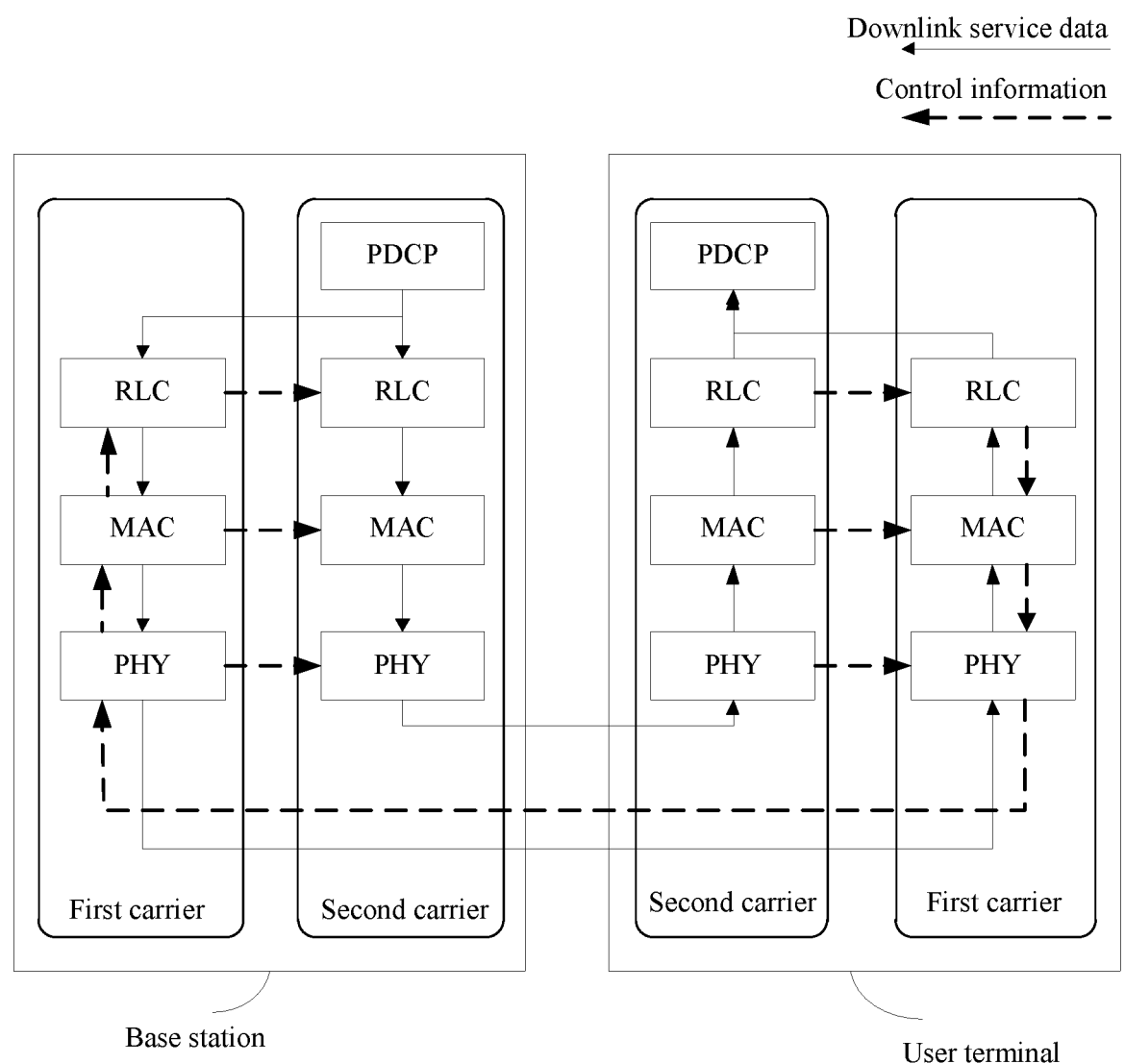
FIG. 7 is a schematic flowchart of transmitting downlink service data and control information according to an embodiment of the present disclosure.

If the base station apparatus in this embodiment of the present disclosure includes only one base station, the first functional entity of the base station apparatus and the second functional entity of the base station apparatus belong to a same base station. The method for transmitting control information provided in this embodiment of the present disclosure is used in this scenario, and a procedure of transmitting downlink service data, first control information, and second control information in a protocol layer structure of the user terminal and the base station is shown in FIG. 7. Each protocol layer in the user terminal and the base station may be regarded as residing in a functional entity that can be separated from another protocol layer.

Downlink service data sent by the base station is split in a PDCP layer of the second carrier to the first carrier. The first downlink service data is sent to the user terminal by using an RLC layer, a MAC layer, and a PHY layer of the first carrier. The second downlink service data is sent to the user terminal by using an RLC layer, a MAC layer, and a PHY layer of the second carrier.

The RLC layer of the second carrier in the user terminal obtains the first control information corresponding to the RLC layer of the first carrier, and sends, by using the second carrier, the first control information obtained by the RLC layer. Similarly, the MAC layer of the second carrier and the PHY layer of the second carrier in the user terminal obtain the corresponding first control information, and send the obtained first control information by using the second carrier. The RLC layer, the MAC layer, and the PHY layer of the second carrier of the user terminal all generate corresponding second control information, and the respective generated second control information is sent by using the second carrier.

The PHY layer of the second carrier in the base station receives the first control information by using the second carrier, and sends the first control information received by the PHY layer to the PHY layer of the first carrier in the base station. Similarly, the MAC layer of the second carrier in the base station receives the corresponding first control information by using the second carrier, and sends the first control information received by the MAC layer to the MAC layer of the first carrier in the base station. The RLC layer of the second carrier in the base station receives the corresponding first control information by using the second carrier, and sends the first control information received by the RLC layer to the RLC layer of the first carrier in the base station.

In this way, the first control information and the second control information between the base station and the user terminal are both sent by using the second carrier, so that air interface overheads of a communications system are reduced and transmission performance of the communications system is improved. Further, the first carrier no longer transmits control information, and the load of the first carrier is reduced.

In addition, for a scenario in which the user terminal sends uplink service data to the base station apparatus and the base station apparatus sends control information to the user terminal, the transmission of control information is similar to that in the foregoing description. Details are not described herein again.

The transmission method provided in this embodiment of the present disclosure is further applicable to a scenario in which the first carrier and the second carrier belong to different RAT technologies and the first carrier and the second carrier perform carrier aggregation.

In a carrier aggregation technology, the PDCP, the RLC, and the MAC are shared between different carriers. Therefore, this embodiment of the present disclosure is applicable to a PHY entity in the carrier aggregation technology. A method for processing control information by the PHY entity in the carrier aggregation technology is the same as the method for processing control information in the foregoing PHY entity. Details are not described herein again.

The PHY entity in the carrier aggregation technology uses the transmission method provided in this embodiment of the present disclosure to send the CSI of the first carrier by using the second carrier, so that a feedback cycle of CSI of the first carrier can be shortened and scheduling performance during transmission of service data by using the first carrier can be improved.

In the method for transmitting control information provided in this embodiment of the present disclosure, the first carrier is configured for the first functional entity in the first communications device (which may be the user terminal or may be the base station apparatus), the second carrier is configured for the second functional entity. After obtaining the first control information of the first functional entity, the second functional entity sends the first control information by using the second carrier. The first control information is no longer sent by using the first carrier, and control information sent by a communications device occupies only resources of the second carrier, thereby reducing air interface overheads of a communications system and improving transmission performance of the communications system.

In particular, for a carrier that carries a tiny amount of uplink service data (or does not carry uplink service data) and carries a large amount of downlink service data, by using the transmission method provided in this embodiment of the present disclosure, control information corresponding to the carrier may be sent by using another carrier, so that overheads of the carrier can be reduced and load of the carrier can be reduced.

An embodiment of the present disclosure provides a communications device 1. With reference to the previous embodiment, the communications device 1 in this embodiment of the present disclosure is a first communications device. The communications device 1 may be a user terminal or may be a base station apparatus that includes at least one base station. The communications device 1 is configured to perform operations performed by the user terminal or the base station apparatus in the foregoing method. The communications device 1 may include modules corresponding to corresponding operations.

Figure 8:
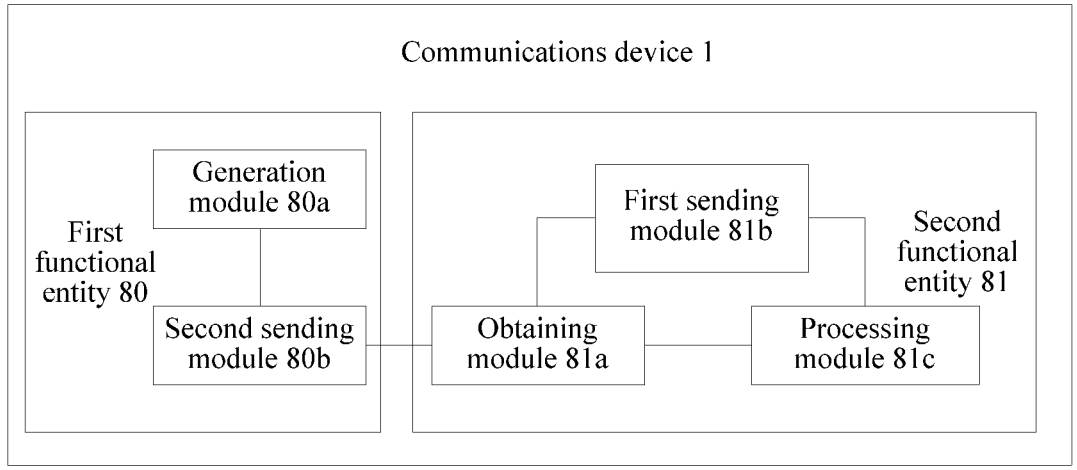
FIG. 8 is a schematic structural diagram 1 of a communications device according to an embodiment of the present disclosure.

As shown in FIG. 8, the communications device 1 includes a first functional entity 80 and a second functional entity 81. A first carrier is configured for the first functional entity 80, and a second carrier is configured for the second functional entity 81.

Functions of the first functional entity 80 and the second functional entity 81 are implemented by using a corresponding software program and/or application module. The first functional entity 80 includes a generation module 80a and a second sending module 80b, and the second functional entity 81 includes an obtaining module 81a, a first sending module 81b, and a processing module 81c.

The obtaining module 81a is configured to obtain first control information of the first functional entity, where the first control information includes a first identifier, and the first identifier is used to indicate the first carrier.

The first sending module 81b is configured to send, by using the second carrier, the first control information obtained by the obtaining module 81a to another communications device.

The another communications device is a device that communicates with the communications device provided in this embodiment of the present disclosure. The first carrier and the second carrier are also configured for the another communications device.

The generation module 80a is configured to generate first information, where the first information is feedback information or is status information or is the feedback information and the status information, the feedback information is information that corresponds to first service data and that is generated after the first service data is received by using the first carrier, and the status information is information generated based on a preset mechanism.

The second sending module 80b is configured to send the first information generated by the generation module 80a to the second functional entity 81.

Further, the obtaining module 81a is configured to receive the first information sent by the second sending module 80b of the first functional entity 80.

Further, the processing module 81c is configured to add the first identifier to the first information received by the obtaining module 81a, to generate the first control information.

Further, the generation module 80a is further configured to generate the first control information, where the first control information includes the first identifier and the first information, the first information is feedback information or is status information or is the feedback information and the status information, the feedback information is information that corresponds to first service data and that is generated by the first functional entity after the first functional entity receives the first service data by using the first carrier, and the status information is information generated by the first functional entity based on a preset mechanism.

Further, the second sending module 80b is configured to send the first control information generated by the generation module 80a to the second functional entity 81.

Further, the obtaining module 81a is further configured to receive the first control information sent by the second sending module 80b of the first functional entity 80.

Further, the obtaining module 81a is further configured to: before obtaining the first control information, obtain a control information transmission rule, where the control information transmission rule is used to instruct the first sending module 81b to send the first control information by using the second carrier.

Figure 9:
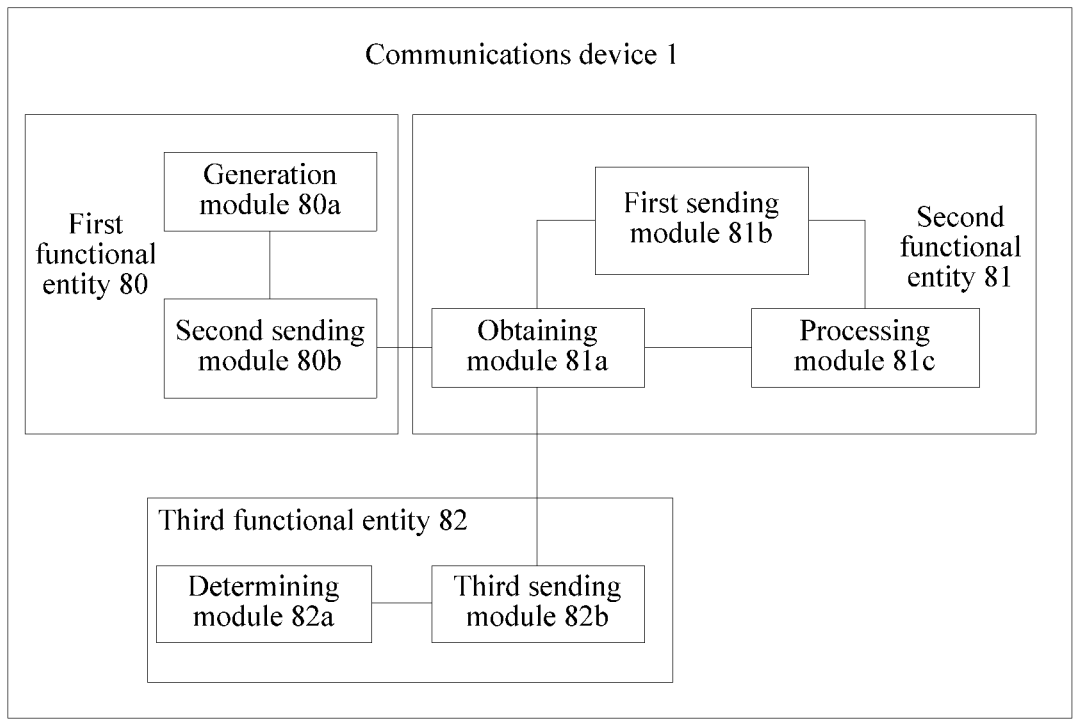
FIG. 9 is a schematic structural diagram 2 of a communications device according to an embodiment of the present disclosure.

Optionally, as shown in FIG. 9, if the communications device 1 is a base station apparatus, the base station apparatus further includes a third functional entity 82. The third functional entity 82 includes a determining module 82a and a third sending module 82b.

The determining module 82a is configured to: when determining that an attribute value of the first carrier and an attribute value of the second carrier both satisfy a preset condition, determine the control information transmission rule.

The third sending module 82b is configured to send the control information transmission rule determined by the determining module 82a to the second functional entity 81.

Further, the obtaining module 81a of the second functional entity 81 is configured to receive the control information transmission rule sent by the third sending module 82b of the third functional entity 82.

Optionally, if the communications device 1 is a user terminal, the user terminal communicates with a base station apparatus, and the first carrier and the second carrier are configured for the base station apparatus, the obtaining module 81a of the second functional entity 81 is configured to receive the control information transmission rule sent by the base station apparatus, where the control information transmission rule is determined by the base station apparatus when the base station apparatus determines that an attribute value of the first carrier and an attribute value of the second carrier both satisfy a preset condition.

The preset condition includes at least one of a first condition, a second condition, or a third condition; the first condition is that a TTI of the first carrier is greater than a first preset threshold, a TTI of the second carrier is less than or equal to a second preset threshold, and the first preset threshold is greater than or equal to the second preset threshold; the second condition is that signal quality of the first carrier is less than a third preset threshold, signal quality of the second carrier is greater than a fourth preset threshold, and the fourth preset threshold is greater than the third preset threshold; and the third condition is that load of the first carrier is greater than a fifth preset threshold, load of the second carrier is less than a sixth preset threshold, and the fifth preset threshold is greater than the sixth preset threshold.

Further, the obtaining module 81a of the second functional entity 81 is further configured to receive, by using the second carrier, third control information sent by the another communications device, where the third control information includes the first identifier.

Further, the first sending module 81b of the second functional entity 81 is further configured to send the third control information to the first functional entity 80 based on the first identifier included in the third control information received by the obtaining module 81a.

It is easily understood that if the obtaining module 81a of the second functional entity 81 in the communications device 1 receives, by using the second carrier, the third control information sent by the another communications device, in the application scenario, the communications device 1 provided in this embodiment of the present disclosure is a receive end device of control information. In this case, the communications device 1 can learn, based on the first identifier included in the third control information, that a target functional entity of the third control information is the first functional entity 80 for which the first carrier is configured. Therefore, the first sending module 81b sends the third control information to the first functional entity 80.

As can be learned with reference to the previous embodiment, in the application scenario, the communications device 1 is the base station apparatus.

It is easily understood that the communications device 1 provided in this embodiment of the present disclosure may be a transmit end device of control information or may be a receive end device of control information.

If the communications device 1 is a transmit end device of control information, the first functional entity is a RLC entity, the first information includes an RLC PDU, and the second functional entity is an RLC entity or a media access control MAC entity; or, the first functional entity is a MAC entity, the first information includes a MAC PDU, and the second functional entity is a MAC entity; or, the first functional entity is a PHY entity, the first information includes PHY control information, and the second functional entity is a PHY entity.

If the communications device 1 is a receive end device of control information, the first functional entity is a RLC entity, the first information includes an RLC PDU, and the second functional entity is an RLC entity; or, the first functional entity is a MAC entity, the first information includes a MAC PDU, and the second functional entity is a MAC entity; or, the first functional entity is a PHY entity, the first information includes PHY control information, and the second functional entity is a PHY entity.

The foregoing RLC entities all perform data processing based on the existing RLC protocol, the foregoing MAC entities all perform data processing based on the existing MAC protocol, and the foregoing PHY entities all perform data processing based on the existing PHY protocol.

It may be understood that the communications device 1 in this embodiment is only logic division based on functions implemented by the communications device 1. During actual application, in the communications device 1, the foregoing units may be combined or divided. In addition, the functions implemented by the communications device 1 provided in this embodiment correspond one-to-one to those implemented by the user terminal or the base station apparatus in the method for transmitting control information provided in the foregoing embodiments. A more detailed processing procedure implemented by the communications device 1 has been described in detail in the foregoing method embodiment. Details are not described herein again.

Figure 10:
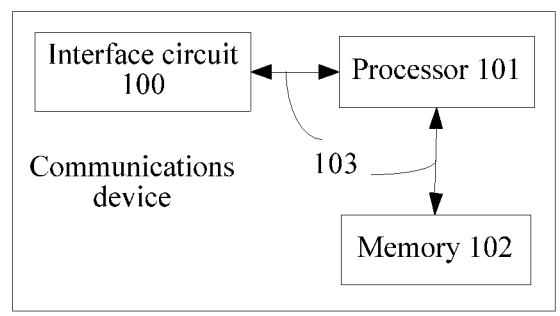
FIG. 10 is a schematic structural diagram 3 of a communications device according to an embodiment of the present disclosure.

Another embodiment of the present disclosure provides a communications device. As shown in FIG. 10, the communications device includes an interface circuit 100, a processor 101, a memory 102, and a system bus 103.

The interface circuit 100, the processor 101, and the memory 102 are connected to each other and complete communication with each other by using the system bus 103.

Persons skilled in the art may understand that the structure of the communications device in FIG. 10 does not constitute a limitation to the communications device, and may include more or fewer components than those shown in the figures, or a combination of some components, or different component layouts.

When the communications device is running, the communications device performs the method for transmitting control information described in the foregoing embodiment. For a specific method for transmitting control information, refer to related description in the foregoing embodiment shown in FIG. 5 or FIG. 6. Details are not described herein again.

The interface circuit 100 is configured to implement a communication connection between the communications device and another communications device.

The memory 102 may be configured to store a software program and an application program. The memory 102 may mainly include a program storage area and a data storage area. The program storage area may store an operating system, an application program required by at least one function (for example, generating first control information and second control information), and the like. The data storage area may store the first control information.

The memory 102 may include a volatile memory, for example, a high-speed random-access memory (RAM), or the memory 102 may include a non-volatile memory, for example, at least one magnetic disk storage device, a flash memory device, or another volatile solid-state storage device.

The processor 101 runs the software program and the application module stored in the memory 102 to perform various functional applications and data processing of the communications device. The processor 101 is a control center of the communications device, connected to various parts of the entire communications device by using various interfaces and lines, performs various functions of the communications device and processes data by running or executing the software program and/or the application module stored in the memory 102 and invoking data stored in the memory 102, to perform overall monitoring on the communications device.

The processor 101 runs the software program and/or the application module stored in the memory 102.

With reference to FIG. 8 or FIG. 9, the software program and/or the application module may implement functions of a first functional entity 80 and a second functional entity 81.

The first functional entity 80 is configured to: generate first information or generate the first control information, and send the first information or the first control information generated by the first functional entity 80 to the second functional entity 81.

The second functional entity 81 is configured to: receive the first information sent by the first functional entity 80, and add a first identifier to the first information to generate the first control information, or, is configured to receive the first control information sent by the first functional entity 80, and is configured to send the first control information.

For detailed functional description of the first functional entity 80 and the second functional entity 81, refer to the foregoing embodiment of the present disclosure. Details are not described herein again.

The processor 101 may be a central processing unit (CPU). The processor 101 may alternatively be another general-purpose processor, a digital signal processor (DSP) or another programmable logic device or transistor logic device, a discrete hardware component, or the like. The general-purpose processor may be a microprocessor or the processor may be any conventional processor or the like.

The system bus 103 may include a data bus, a power bus, a control bus, a signal status bus, and the like. In this embodiment, for a purpose of clear description, all buses are marked as the system bus 103 in FIG. 10.

This embodiment of the present disclosure provides a communications device. The communications device includes the first functional entity and the second functional entity, a first carrier is configured for the first functional entity, and a second carrier is configured for the second functional entity. After obtaining the first control information of the first functional entity, the second functional entity sends the first control information by using the second carrier. The first control information is no longer sent by using the first carrier, and control information sent by the communications device occupies only resources of the second carrier, thereby reducing air interface overheads of a communications system and improving transmission performance of the communications system.

In particular, for a carrier that carries a tiny amount of uplink service data (or does not carry uplink service data) and carries a large amount of downlink service data, control information corresponding to the carrier may be sent by using another carrier, so that overheads of the carrier can be reduced and load of the carrier can be reduced.

It is understood by persons skilled in the art that, for the purpose of convenient and brief description, division of the foregoing function modules is taken as an example for illustration. In actual application, the foregoing functions can be allocated to different function modules and implemented based on a requirement, that is, an inner structure of a mobile device is divided into different function modules to implement all or part of the functions described above. For a detailed working process of the foregoing system, mobile device, and unit, refer to a corresponding process in the foregoing method embodiments, and details are not described herein again.

In the several embodiments provided in this application, it should be understood that the disclosed system, mobile device, and method may be implemented in other manners. For example, the described mobile device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the operations of the methods described in the embodiments of the present disclosure. The foregoing storage medium includes: any medium that can store program code, such as a USB flash drive, a removable hard disk, a read-only memory (ROM), a random-access memory (RAM), a magnetic disk, or an optical disc.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting control information, wherein the method is implemented by a first communications device, the first communications device comprises a first functional entity and a second functional entity, a first carrier is configured for the first functional entity, a second carrier is configured for the second functional entity, and the method comprises:
    obtaining, by the second functional entity, a control information transmission rule, wherein the control information transmission rule is used to instruct the second functional entity to send first control information by using the second carrier, wherein the first communications device is a base station apparatus, and wherein the base station apparatus further comprises a third functional entity, wherein the obtaining, by the second functional entity, the control information transmission rule comprises:
        receiving, by the second functional entity, the control information transmission rule sent by the third functional entity, wherein the control information transmission rule is determined by the third functional entity when the third functional entity determines that an attribute value of the first carrier and an attribute value of the second carrier both satisfy a preset condition;
    obtaining, by the second functional entity including one of a radio link control (RLC) entity, a media access control (MAC) entity or a physical (PHY) entity for which the second carrier is configured, the first control information of the first functional entity including one of an RLC entity, an MAC entity or a PHY entity for which the first carrier is configured, wherein the first control information comprises a first identifier, and the first identifier is used to indicate the first carrier; and
    sending, by the second functional entity, the first control information to a second communications device by using the second carrier.

2. The method according to claim 1, wherein the obtaining, by the second functional entity, first control information of the first functional entity comprises:
    receiving, by the second functional entity, first information sent by the first functional entity, wherein the first information is feedback information, or is status information, or is the feedback information and the status information, the feedback information is information that corresponds to first service data and that is generated by the first functional entity after the first functional entity receives the first service data by using the first carrier, and the status information is information generated by the first functional entity based on a preset mechanism; and
    adding, by the second functional entity, the first identifier to the first information to generate the first control information.

3. The method according to claim 1, wherein the obtaining, by the second functional entity, first control information of the first functional entity comprises:
    receiving, by the second functional entity, the first control information sent by the first functional entity, wherein the first control information comprises the first identifier and first information, the first information is feedback information, or is status information, or is the feedback information and the status information, the feedback information is information that corresponds to first service data and that is generated by the first functional entity after the first functional entity receives the first service data by using the first carrier, and the status information is information generated by the first functional entity based on a preset mechanism.

4. The method according to claim 1, wherein
    the preset condition comprises at least one of a first condition, a second condition, or a third condition; the first condition is that a transmit time interval (TTI) of the first carrier is greater than a first preset threshold, a TTI of the second carrier is less than or equal to a second preset threshold, and the first preset threshold is greater than or equal to the second preset threshold, the second condition is that signal quality of the first carrier is less than a third preset threshold, signal quality of the second carrier is greater than a fourth preset threshold, and the fourth preset threshold is greater than the third preset threshold, and the third condition is that load of the first carrier is greater than a fifth preset threshold, load of the second carrier is less than a sixth preset threshold, and the fifth preset threshold is greater than the sixth preset threshold.

5. The method according to claim 1, further comprising:
    receiving, by the second functional entity by using the second carrier, third control information sent by the second communications device, wherein the third control information comprises the first identifier; and
    sending, by the second functional entity, the third control information to the first functional entity based on the first identifier.

6. A communications device, comprising: an interface circuit, a processor, and a memory, wherein
    the interface circuit is configured to implement a communication connection between the communications device and another communications device;

the memory is configured to store instructions;
the processor is configured to invoke and run the instructions stored in the memory, to implement functions of a first functional entity and a second functional entity; wherein
the second functional entity, which includes one of a radio link control (RLC) entity, a media access control (MAC) entity or a physical (PHY) entity for which a second carrier is configured, is configured to obtain a control information transmission rule, wherein the control information transmission rule is used to instruct the second functional entity to send first control information by using the second carrier;
  wherein the communications device is a base station apparatus, and the memory further comprises instructions that, when executed by the processor, cause the device to implement functions of a third functional entity, wherein the third functional entity is configured to: when determining that an attribute value of a first carrier and an attribute value of the second carrier both satisfy a preset condition, determine the control information transmission rule; and send the control information transmission rule determined by a determining module to the second functional entity; the second functional entity is configured to: receive the control information transmission rule sent by the third functional entity;
the second functional entity is further configured to obtain the first control information of the first functional entity including one of an RLC entity, an MAC entity or a PHY entity for which the first carrier is configured, wherein the first control information comprises a first identifier, and the first identifier is used to indicate the first carrier, wherein the first carrier is configured for the first functional entity; and
the second functional entity is configured to send the first control information to the other communications device by using the second carrier, wherein the second carrier is configured for the second functional entity.

7. The device according to claim 6, wherein
the first functional entity is configured to: generate first information, wherein the first information is feedback information, or is status information, or is the feedback information and the status information, the feedback information is information that corresponds to first service data and that is generated after the first service data is received by using the first carrier, and the status information is information generated based on a preset mechanism, and send the first information generated by a generation module to the second functional entity; and
the second functional entity is configured to: receive the first information sent by a second sending module of the first functional entity, and add the first identifier to the first information received by an obtaining module, to generate the first control information.

8. The device according to claim 6, wherein
the first functional entity is configured to: generate the first control information, wherein the first control information comprises the first identifier and first information, the first information is feedback information, or is status information, or is the feedback information and the status information, the feedback information is information that corresponds to first service data and that is generated by the first functional entity after the first functional entity receives the first service data by using the first carrier, and the status information is information generated by the first functional entity based on a preset mechanism, and send the first control information generated by a generation module to the second functional entity; and
the second functional entity is configured to: receive the first control information sent by a second sending module of the first functional entity.

9. The device according to claim 6, wherein
the preset condition comprises at least one of a first condition, a second condition, or a third condition; the first condition is that a transmit time interval (TTI) of the first carrier is greater than a first preset threshold, a TTI of the second carrier is less than or equal to a second preset threshold, and the first preset threshold is greater than or equal to the second preset threshold, the second condition is that signal quality of the first carrier is less than a third preset threshold, signal quality of the second carrier is greater than a fourth preset threshold, and the fourth preset threshold is greater than the third preset threshold, and the third condition is that load of the first carrier is greater than a fifth preset threshold, load of the second carrier is less than a sixth preset threshold, and the fifth preset threshold is greater than the sixth preset threshold.

10. The device according to claim 6, wherein
the second functional entity is further configured to:
receive, by using the second carrier, third control information sent by the another communications device, wherein the third control information comprises the first identifier; and
send the third control information to the first functional entity based on the first identifier.

11. A non-transitory machine-readable medium having instructions stored therein, which when executed by a processor, cause the processor to perform operations and implement functions of a first functional entity and a second functional entity of a communication device, the operations comprising:
obtaining, by the second functional entity, a control information transmission rule, wherein the control information transmission rule is used to instruct the second functional entity to send first control information by using a second carrier, wherein the communications device is a base station apparatus, and wherein the base station apparatus further comprises a third functional entity, wherein the obtaining, by the second functional entity, the control information transmission rule comprises:
  receiving, by the second functional entity, the control information transmission rule sent by the third functional entity, wherein the control information transmission rule is determined by the third functional entity when the third functional entity determines that an attribute value of a first carrier and an attribute value of the second carder both satisfy a preset condition;
obtaining, by the second functional entity including one of a radio link control (RLC) entity, a media access control (MAC) entity or a physical (PHY) entity for which a second carder is configured, the first control information of the first functional entity including one of an RLC entity, an MAC entity or a PHY entity for which a first carrier is configured, wherein the first control information comprises a first identifier, and the first identifier is used to indicate the first carrier, wherein the first carrier is configured for the first functional entity; and sending, by the second functional entity, the first control information to a second communications device by using the second carrier, wherein the second carrier is configured for the second functional entity.

12. The non-transitory machine-readable medium according to claim 11, wherein the obtaining, by the second functional entity, first control information of the first functional entity comprises:
- receiving, by the second functional entity, first information sent by the first functional entity, wherein the first information is feedback information, or is status information, or is the feedback information and the status information, the feedback information is information that corresponds to first service data and that is generated by the first functional entity after the first functional entity receives the first service data by using the first carrier, and the status information is information generated by the first functional entity based on a preset mechanism; and
- adding, by the second functional entity, the first identifier to the first information to generate the first control information.

* * * * *

UNITED STATES PATENT AND TRADEMARK OFFICE
CERTIFICATE OF CORRECTION

PATENT NO. : 11,064,503 B2
APPLICATION NO. : 16/159273
DATED : July 13, 2021
INVENTOR(S) : Xingxing Hu et al.

It is certified that error appears in the above-identified patent and that said Letters Patent is hereby corrected as shown below:

In the Claims

In Claim 11, Column 28, Line 55, "carder" should be --carrier--.

In Claim 11, Column 28, Line 60, "carder" should be --carrier--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*